(12) United States Patent
Oki et al.

(10) Patent No.: US 11,821,817 B2
(45) Date of Patent: Nov. 21, 2023

(54) ELECTRODE, CORROSION ANALYSIS DEVICE, AND CORROSION ANALYSIS METHOD

(71) Applicant: Nippon Telegraph and Telephone Corporation, Tokyo (JP)

(72) Inventors: Shota Oki, Musashino (JP); Shingo Mineta, Musashino (JP); Mamoru Mizunuma, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 427 days.

(21) Appl. No.: 17/287,215

(22) PCT Filed: Nov. 1, 2019

(86) PCT No.: PCT/JP2019/043149
§ 371 (c)(1),
(2) Date: Apr. 21, 2021

(87) PCT Pub. No.: WO2020/100642
PCT Pub. Date: May 22, 2020

(65) Prior Publication Data
US 2021/0381950 A1    Dec. 9, 2021

(30) Foreign Application Priority Data
Nov. 16, 2018  (JP) .................................. 2018-215429

(51) Int. Cl.
*G01N 27/02*  (2006.01)
*G01N 17/00*  (2006.01)
(Continued)

(52) U.S. Cl.
CPC .......... *G01N 17/006* (2013.01); *G01N 17/02* (2013.01)

(58) Field of Classification Search
CPC ...... G01N 17/02; G01N 17/006; G01N 21/00; G01N 23/00; G01N 27/02; C23F 13/22
See application file for complete search history.

(56) References Cited

FOREIGN PATENT DOCUMENTS

| CN | 105334309 A | * | 2/2016 |
| JP | 2000046778 A | * | 2/2000 |

(Continued)

OTHER PUBLICATIONS

Kiyoyuki Kaito, et al., *The Effects of Prior Subjective Information to Bayesian Updating Results of Deterioration Prediction*, Collection of Structural Engineering Treatises, vol. 53A, 2007.
(Continued)

*Primary Examiner* — Jill A Warden
(74) *Attorney, Agent, or Firm* — Workman Nydegger

(57) ABSTRACT

To provide a technology capable of analyzing soil corrosion of an underground buried metal material. There is provided an electrode for analyzing corrosion of a buried metal material in real time, the electrode including: a metal portion composed of a metal material; a metal fixation portion covering and fixing the metal portion except on an exposed surface thereof; a plurality of particles arranged so as to be in contact with the exposed surface; a gelation substance portion covering the plurality of particles and being in close contact with the exposed surface and the metal fixation portion; and a conduction portion that secures electric conduction with the metal portion, wherein the plurality of particles and the gelation substance portion transmit light.

10 Claims, 9 Drawing Sheets

(51) Int. Cl.
*G01N 17/02* (2006.01)
*G01N 27/26* (2006.01)

(56) References Cited

FOREIGN PATENT DOCUMENTS

| JP | 2011075477 A | * | 4/2011 |
| JP | 2012154783 A | * | 8/2012 |
| JP | 2017072592 A | * | 4/2017 |

OTHER PUBLICATIONS

Nobuyoshi Hara, *Recent Progress and Future Directions in Studies on Localized Corrosion, Materials and Environment*, vol. 63, 2014, pp. 132-137.
Hideyuki Murai et al., *Drug Release Behavior Using pH-Responsive Polymer Chitosan Gel*, Outline of the 39th Annual Meeting of Nihon University, No. 39, 2006, pp. 5-52.
Tkaharu Sakiyama, *Analysis and Control of Swelling Behaviors of Polymer Gels*, Journal of Japan Food Engineering Society, vol. 12, No. 2, 2011, pp. 47-53.
Mie Hattori et al., Effect of Salts on Swelling of Poly (ethylene oxide) Gels, Life Engineering Research, vol. 4, No. 2, 2002, pp. 274-277.
Bunzo Tsujino et al., *Corrosion Behavior of Steel and Application of Monitoring in Soil*, Surface Technology, vol. 40, No. 5, 1989, pp. 707-708.
Satoru Yamamoto et al., *Development of Corrosion Rate Measurement Method (CIPE method) for Concrete Medium Steel*, Rust, 2015, pp. 2-8.
Yoshikazu Miyata et al., *Corrosion Monitoring of Metals in Soils by Electrochemical and Related Methods: Part* 1, Materials and Environment, vol. 46, 1997, pp. 541-551.
Nobuyoshi Hara, *Passivation of Stainless Steel and Advances in Local Corrosion Research*, Materia Japan, vol. 55, No. 5, 2016, pp. 207-214.

* cited by examiner

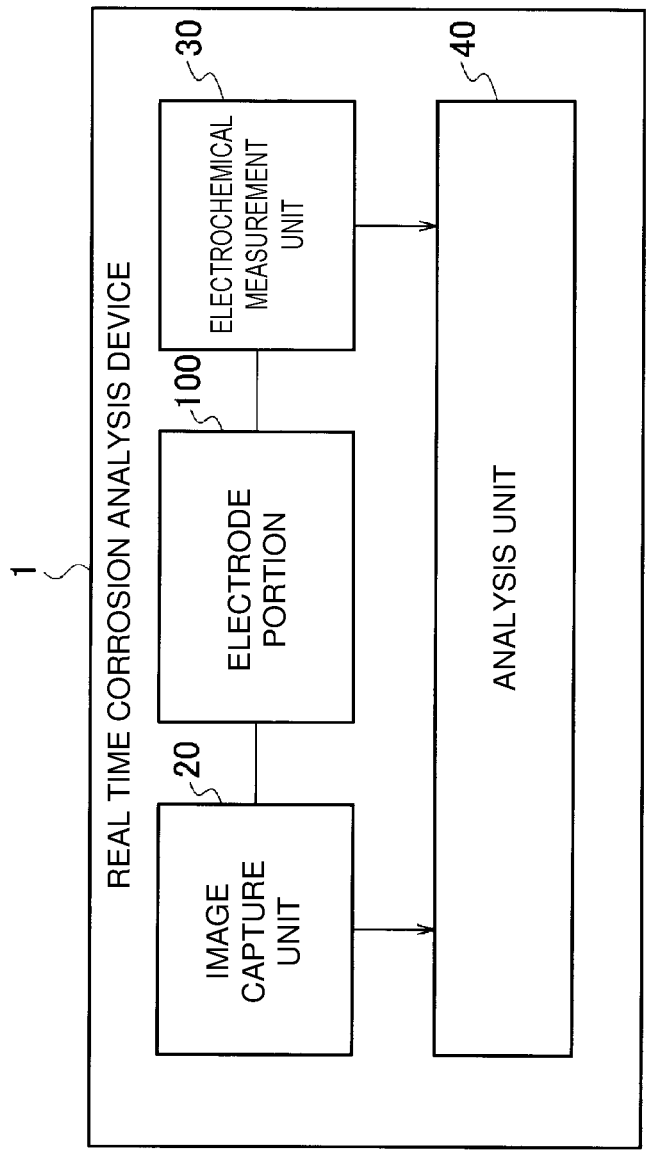

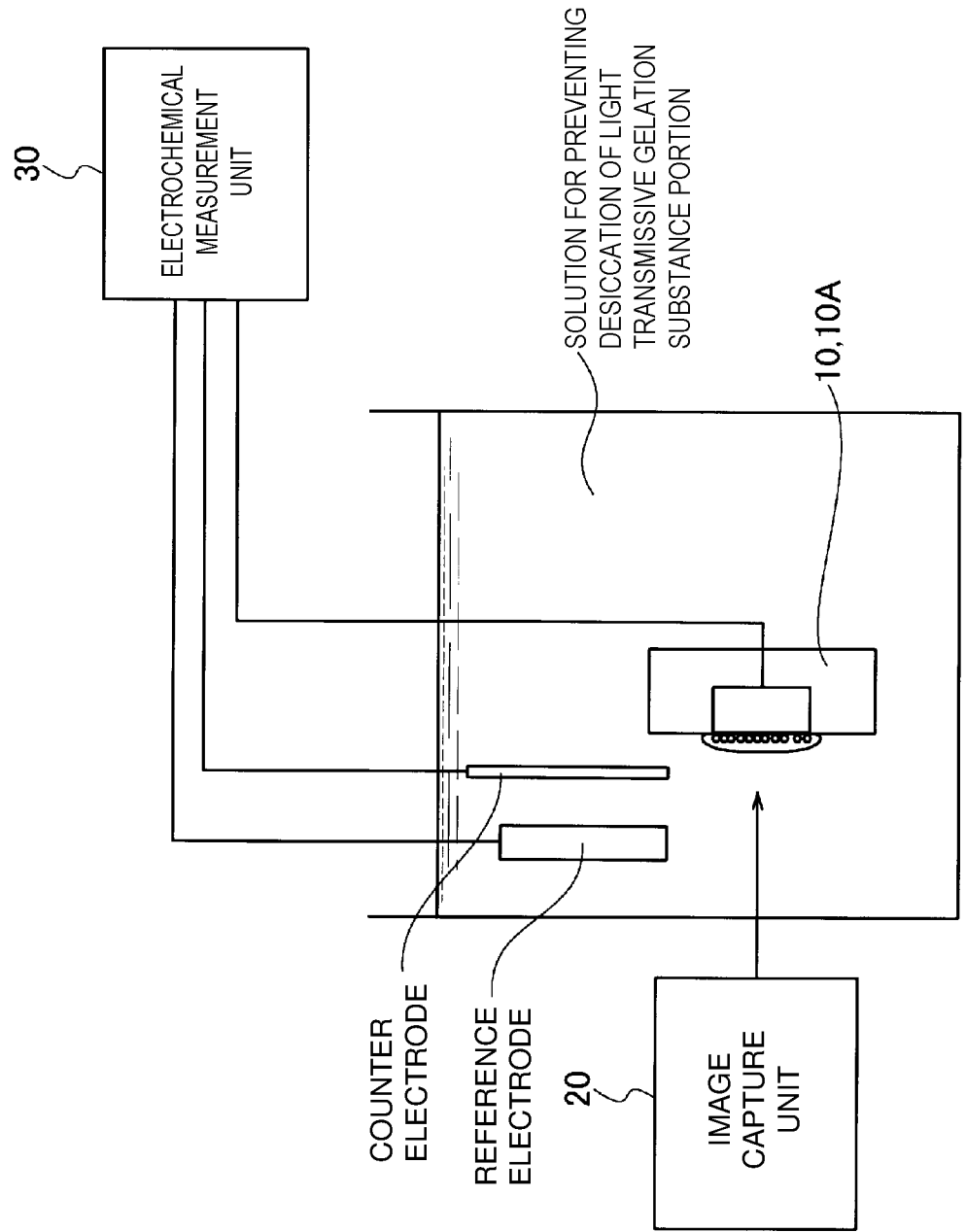

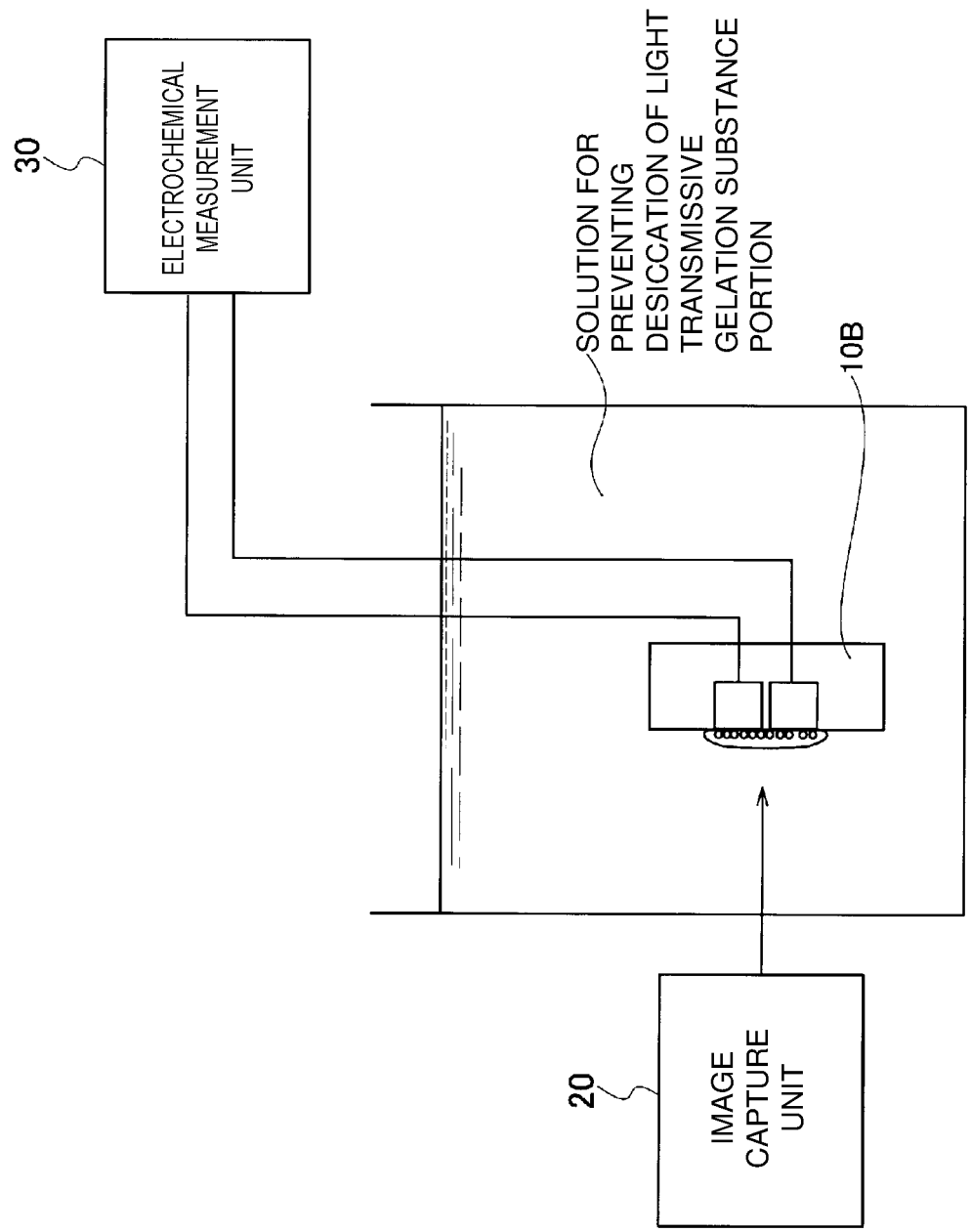

ELECTRODE, CORROSION ANALYSIS DEVICE, AND CORROSION ANALYSIS METHOD

TECHNICAL FIELD

The present invention relates to a technology of analyzing corrosion of an underground buried metal material.

BACKGROUND ART

A large quantity of infrastructure facilities supporting our daily lives had been being developed rapidly for about two decades during and after the period of high economic growth. A half or more of the entirety of such facilities will therefore experience five decades after their building in coming 2030, and hence, it is concerned that facilities expected to be outdated increase more and more in the future. Moreover, the population of working skilled engineers is rapidly decreasing who are essential to securely maintain and manage the infrastructure facilities, which circumstance monotonously decreases tolerance for maintenance of these. It is accordingly deeply concerned that the infrastructure facilities will be difficult to continuously maintain.

When deterioration of the facilities can be predicted against such circumstances, it can be determined when and how to treat which facilities in advance, and hence, a long term, efficient maintenance plan can be established.

A statistical technique is typically employed to predict and estimate the deterioration of facilities. The statistical technique is characterized in modeling rules behind deterioration processes with huge inspection data of the facilities, and can lead to getting the picture of averages of deterioration events on the whole facilities (Non-Patent Literature 1). The deterioration prediction using the statistical technique above is effective for an imaginary facility that should have a plenty of inspection data accumulated from daily inspection thereof. Nevertheless, most of underground buried facilities do not have data acceptable for the statistical analysis accumulated since their inspection data cannot be easily obtained due to incapability of their direct visual examination.

Examples of the underground buried facilities include pipe lines for water and gas, power cable tubes, underground storage tanks, overpackages for spent nuclear fuel, steel pipe poles and branch line anchors, and for those, quite a plenty of metal materials such as steel materials are used. Deterioration of the underground buried metal materials proceeds due to soil corrosion. The soil corrosion is a phenomenon that a metal material is generating rust at its interface in contact with the soil and decreasing the thickness of the material itself. In order to predict the deterioration of an underground buried facility, a technique is effective to elucidate corrosion mechanisms in view of materials and establish a corrosion progress model (corrosion rate equation).

One of the most important elements on the elucidation of corrosion mechanisms is real time analysis of corrosion surfaces. For example, development of in situ analysis techniques using various microscopes had largely advanced studies oriented to elucidation of mechanisms of occurrence of localized corrosion (Non-Patent Literature 2).

CITATION LIST

Non-Patent Literature

Non-Patent Literature 1: K. Kaito, K. Sugisaki, K. Kobayashi, "The Influence of Prior Subjective Information on Bayesian Updating of Deterioration Prediction Results", Japan Society of Civil Engineers, Proceedings of Structural Engineering, Vol. 53A, pp. 775-783 (2007).

Non-Patent Literature 2: N. Hara, "Advances and the Future of Studies on Localized Corrosion", Zairyo (Material) to [particle] Kankyo (Environment), Vol. 63, pp. 132-137 (2014).

Non-Patent Literature 3: H. Murai, A. Kashiwada, K. Matsuda, "Swelling Properties and Drug Release Behavior of pH-Responsive Chitosan Gel", The 56th Annual Meeting of the Society of Polymer Science, Japan, Vol. 56, pp. 1749-1750 (2007).

Non-Patent Literature 4: T. Sakiyama, "Analysis and Control of Swelling Behaviors of Polymer Gels", Japan Journal of Food Engineering, Vol. 12, No. 2, pp. 47-53 (2011).

Non-Patent Literature 5: M. Hattori, T. Nakanishi, "Effects of Salts on Swelling of PEO Gels", Journal of Human Environmental Engineering, Vol. 4, No. 2, pp. 274-277 (2002).

Non-Patent Literature 6: B. Tsujino, T. Oki, "Corrosion Behavior of Steel and Application of Monitoring in Soil", Journal of the Surface Finishing Society of Japan, Vol. 40, No. 5, pp. 707-708 (1989).

Non-Patent Literature 7: S. Yamamoto, K. Takeko, S. Takaya, "Konkuriito-Chuu-Kouzai (Steel Materials in the Concrete) no [particle] Fushoku-Sokudo-Sokutei-Houhou (Method for Measuring Corrosion Rate) (CIPE-Hou (CIPE Method)) no [particle] Kaihatsu (Development)", Sabi (a journal of The Nippon Corrosion Engineering Co., Ltd.), No. 148, pp. 2-8 (2015).

Non-Patent Literature 8: Y. Miyata, S. Asakura, "Corrosion Monitoring of Metals in Soils by Electrochemical and Related Methods: Part I", Zairyo (Material) to [particle] Kankyo (Environment), Vol. 46, pp. 541-551 (1997).

Non-Patent Literature 9: N. Hara, "Recent Advances in Studies on Passivity and Localized Corrosion of Stainless Steels", Materia Japan, Vol. 55, No. 5, pp. 207-214 (2016).

SUMMARY OF THE INVENTION

Technical Problem

In conventional real time analyses, it is supposed that corrosion progresses in the atmosphere or under water, and most of the observations are performed in aqueous solutions. Meanwhile, there have been no examples of real time analyses on metal materials buried in the soil yet. In the first place, such real time analyses are impossible due to incapability of visual examination on the metal surfaces of those buried in the soil since soil particles therein work as obstacles.

Corrosion in the soil occurs in a special environment where a solid phase (soil), a liquid phase (water) and a gas phase (air) coexist, being different from that in the atmosphere or under water. The corrosion in the soil has been taken as occurring at the interface between the surface of a metal material and water like the corrosion under water. Nevertheless, there have been no examples of real time analysis on processes of occurrence and progress of soil corrosion in regions such as a region where soil particles and the metal surface are in contact with each other, a region where water exists that is captured in pores between the soil particles and the metal surface through capillarity, and a region where air captured in gaps among the soil particles is in contact with the metal surface.

Moreover, when an electrochemical measurement technique is used, an average corrosion rate on the whole metal surface is to be derived. Therefore, electrochemical measurement performed on metal on which corrosion progresses locally only at a single point makes the derived corrosion rate estimated to be low. Due to a high possibility that a corrosion risk in such a case is determined to be low, it is concerned that a risk of failure, of a facility, caused by getting holes or the like through localized corrosion is overlooked.

It is very difficult to apply real time analysis on the corrosion surface to an underground buried metal material. The reason is that the presence of soil particles covering the metal material disables visual observation of the surface of the metal material.

The present invention is devised in view of such problems, and an object thereof is to provide a technology capable of analyzing soil corrosion of an underground buried metal material in real time.

Means for Solving the Problem

An electrode according to an aspect of the present invention is an electrode for analyzing corrosion of a buried metal material in real time, the electrode including: a metal portion composed of a metal material; a metal fixation portion covering and fixing the metal portion except on an exposed surface thereof; a plurality of particles arranged so as to be in contact with the exposed surface; a gelation substance portion covering the plurality of particles and being in close contact with the exposed surface and the metal fixation portion; and a conduction portion that secures electric conduction with the metal portion, wherein the plurality of particles and the gelation substance portion transmit light.

Moreover, a corrosion analysis device according to an aspect of the present invention includes: the electrode; an image capture unit that captures an image of the exposed surface from a direction where the plurality of particles and the gelation substance portion are arranged; an electrochemical measurement unit that is connected to the electrode via the conduction portion and performs electrochemical measurement of the electrode; and an analysis unit that calculates a corrosion rate of the metal portion using a captured image by the image capture unit and a measurement result of the electrochemical measurement unit.

Moreover, a corrosion analysis device according to an aspect of the present invention is a corrosion analysis method performed by the corrosion analysis device, the method including: an image capturing step of capturing the image of the exposed surface of the metal portion; an electrochemical measurement step of parallelly performing the electrochemical measurement of the electrode and the image capturing step; and a step of calculating the corrosion rate of the metal portion using the captured image in the image capturing step and the measurement result in the electrochemical measurement step.

Effects of the Invention

According to the present invention, there can be provided a technology capable of analyzing soil corrosion of an underground buried metal material in real time.

BRIEF DESCRIPTION OF DRAWINGS

FIG. 4 is a structure diagram schematically showing a configuration of a corrosion analysis device of the present embodiment;

FIG. 5 is a structure diagram schematically showing a configuration of an electrode portion in the case of using a three-electrode system.

FIG. 6 is a structure diagram schematically showing a configuration of an electrode portion in the case of using a two-electrode system.

DESCRIPTION OF EMBODIMENTS

Figure 1A:
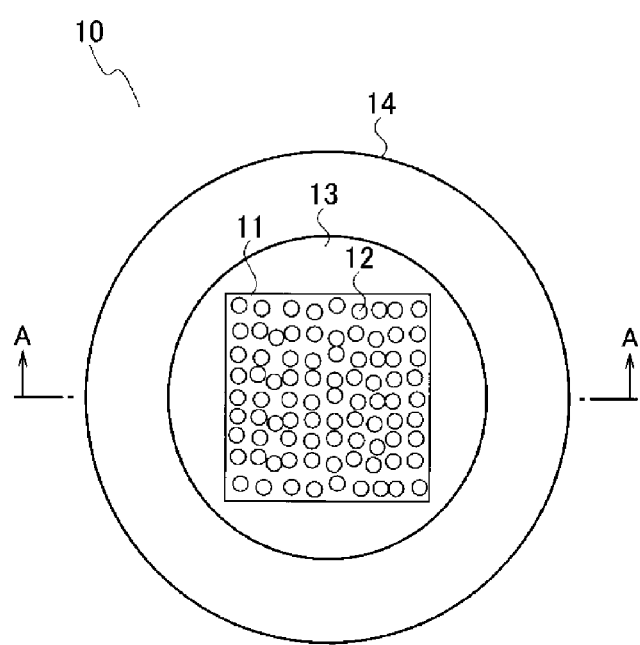
FIG. 1 is a structure diagram schematically showing a configuration of an electrode of the present embodiment.

A soil environment is a complex environment where a solid phase, a liquid phase and a gas phase coexist. It is said that corrosion of a metal material buried in the soil progresses in accordance with reactions of formulae (A1) and (A2) below, which are basically equivalent to those in the atmosphere and in an aqueous solution

$$\text{Fe} \rightarrow \text{Fe}^{2+} + 2e^- \quad (A1)$$

$$O_2 + 2H_2O + 4e^- \rightarrow 4OH^- \quad (A2)$$

Nevertheless, being different from those in the atmosphere and in an aqueous solution, the corrosion of the buried metal material progresses in various metal surface states due to the presence of a solid phase (soil particles). There exist the metal surface states such, for example, as a region where soil particles are in contact with the metal surface, a region where water is in contact with the metal surface, a region where water exists that is captured in gaps in the vicinity where soil particles and the metal surface are in contact with each other through capillarity, and a region where air and the metal surface are in contact with each other. It is inferred that these regions are different in desiccation behavior of water required for the corrosion reaction, an oxygen concentration depending on the degree of filling of soil particles, and the like, and hence, it is thought that the corrosion progresses differently in these regions.

When a corrosion rate is electrochemically calculated, the obtained result indicates the total of corrosion reactions occurring on the metal surface. This accordingly disables differences in corrosion rate between the aforementioned regions from being evaluated. Notably, among these regions, a region fast in progress of corrosion is regarded as an "active region", and a region slow in progress of corrosion as an "inactive region".

One can consider two corrosion patterns (corrosion modes) when the electrochemically calculated corrosion rate has a small value. A first corrosion pattern of these two is a pattern that entire surface corrosion progresses on the entire metal surface at a relatively low rate. A second corrosion pattern thereof is a pattern that localized corrosion progresses only on a partial, very small area thereon.

When only the electrochemical measurement is performed, a corrosion risk results in being evaluated to be low.

This possibly causes overlooking of getting holes in active regions for an actual facility (buried metal material) that applies to the second corrosion pattern. Occurrence of such getting holes may cause a severe accident, for example, in a facility such as a waterwork pipe, a gas pipe and an underground storage tank. Such possible overlooking is caused by the fact that how the corrosion of a buried metal material occurs and progresses has not been understood yet.

One can therefore come up with real time analysis of a metal surface. If corrosion occurring on the metal surface can be directly observed in situ (in the site), it can be elucidated which portions correspond to active regions or inactive regions on the metal surface. Moreover, specifying the places of occurrence of the active regions can largely contribute to elucidation of mechanisms of soil corrosion. The real time analysis of a metal surface can be simultaneously used to the electrochemical measurement, and hence, a highly reliable method for evaluating soil corrosion can be established by combination of in situ observation with images and electrochemical quantitative evaluation.

However, it is very difficult to apply the real time analysis of a metal surface to an underground buried metal material. This is because the metal surface cannot be visually observed due to the presence of soil particles covering the metal material. With the present embodiment, an electrode and a device are provided capable of analyzing corrosion of an underground buried metal material in real time through simulation of surface conditions under which soil corrosion occurs by using light transmissive particles as a solid phase and using a light transmissive gelation substance which plays a role of a liquid phase supplying water required for the corrosion reaction while securing contact between the light transmissive particles and the metal surface.

Hereafter, an embodiment of the present invention will be described using the drawings. The like components in these drawings are given the same reference numerals.

Configuration of Electrode

Figure 1B:
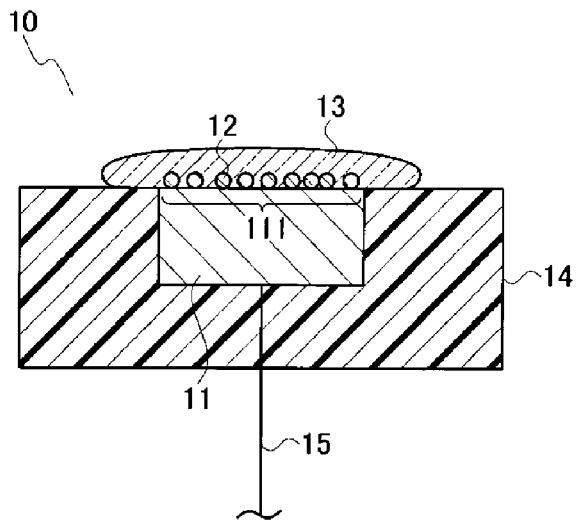

FIG. 1 shows a configuration diagram schematically showing an exemplary configuration of an electrode 10 (real time analyzing electrode) according to an embodiment of the present invention for analyzing corrosion of a buried metal material in real time. FIG. 1(a) is a plan view as the electrode 10 is viewed from the above. FIG. 1(b) is a sectional view of the electrode 10 taken along the A-A line shown in FIG. 1(a).

The electrode 10 shown in FIG. 1 at least includes one metal portion 11, one group of a plurality of light transmissive particles 12, one light transmissive gelation substance portion 13, one metal fixation portion 14, and one conduction portion 15.

The metal portion 11 is composed of a metal material of the same kind as that of the metal material (metal) of a target the corrosion of which is wanted to be analyzed in real time. The metal portion 11 is covered by the metal fixation portion 14 on all of the faces (at all the portions) except one exposed surface 111. Notably, while the metal portion 11 shown is a rectangular solid, the shape of the metal portion 11 is not limited to a rectangular solid shape but may be a shape which has one flat surface to be an exposed surface.

The exposed surface of the metal portion 11 is a portion thereof that is not covered by the metal fixation portion 14. The dimensions of the metal portion 11 are not limited. It should be noted that the area of the exposed surface of the metal portion 11 needs to be known on which a corrosion test is to be performed. Knowing the area of the exposed surface enables a corrosion rate to be calculated from the results of electrochemical measurements.

The exposed surface of the metal portion 11 may be mirror polished in order to observe change in surface condition in detail during real time analysis. For example, the exposed surface is polished using sheets of waterproof abrasive paper up to #1500 of granularity in the final stage. The polishing is sequentially performed starting with abrasive paper with low granularity, for example, sequentially with #220, #320, #800 and #1500 of granularities. Polishing may be performed with continuously pouring water in order to prevent the surface condition from changing due to frictional heat.

Furthermore, a fine mirror surface can be obtained when after the polishing up to #1500 of granularity, the exposed surface is buffed with an abrasive compound-applied cloth. Using a sheet of abrasive paper finer than #1500 of granularity can prepare a much better mirror surface.

The plurality of light transmissive particles 12 are arranged so as to be in contact with the exposed surface of the metal portion 11. The plurality of light transmissive particles play a role of soil particles. The light transmissive particles 12 are composed of a material which transmits light such that the exposed surface of the metal portion 11 can be visually observed. Moreover, in order to maintain such light transmissivity that the exposed surface of the metal portion 11 can be visually observed, the light transmissive particles 12 in contact with the exposed surface are preferably formed into one layer. It should be noted that the light transmissive particles may be formed into a plurality of layers as long as visual observation therethrough can be ensured.

For the light transmissive particles 12, glass beads, ceramic particles and the like can be used, for example. It should be noted that since the amounts of constituent elements contained in the soil particles are larger in the order of silicon, aluminum, iron, calcium, sodium and magnesium, glass beads composed of silicon are preferably used for the portion of the light transmissive particles 12.

Any particle size can be employed for the light transmissive particles 12. Since, on soil corrosion, the particle size for the soil is an important factor that determines the conditions of water and oxygen existing on the metal surface, real time analyses of corrosion are preferably performed using the plurality of light transmissive particles 12 with different particle sizes.

For example, when a soil environment exists in which soil corrosion extremely rapidly progresses, its cause may be examined by sampling the soil on the site and determining the particle size for it based on the result obtained from particle size distribution measurement. As a specific technique of measuring a particle size distribution, for example, a method for mechanical analysis of soil disclosed in JIS A 1204:2009 may be employed or a laser diffraction/scattering particle size analysis method may be employed.

It should be noted not only that the method for mechanical analysis of soil in the above JIS disclosure must employ sieve analysis for 75 µm or more and sedimentation analysis for being less than 75 µm which analyses take a long time for affording the result but also that the analyses need soil more than 500 mL. The laser diffraction/scattering particle size analysis method only takes a very short time for the measurement, that is, tens of seconds, and in addition, only needs several milliliters of soil required for the analysis. Accordingly, the laser diffraction/scattering particle size analysis method is preferably applied to the particle size distribution measurement.

Notably, when the particle size distribution of the soil has a wide range and homogenization of the soil is insufficient, a correct result is possibly not to be obtained depending on a sampling manner. Therefore, a plurality of sampling data are preferably acquired after sufficient homogenization of the soil, being averaged into the final measurement result.

Based on the particle size distribution thus obtained, the plurality of light transmissive particles 12 (glass beads and the like) with various particle sizes from very large one to very small one may be mixed for real time analysis of corrosion, and thereby, the cause of the extremely rapid progress of soil corrosion can be examined.

The light transmissive gelation substance 13 is arranged in the state of covering the exposed surface of the metal portion 11 and the light transmissive particles 12 and being in close contact with the metal portion 11 (exposed surface) and the metal fixation portion 14. The light transmissive gelation substance 13 contains water so as to play a role of supplying water required for the corrosion reaction onto the exposed surface while securing adhesion between the exposed surface of the metal portion 11 and the light transmissive particles 12. Moreover, the light transmissive gelation substance 13 of the present embodiment is composed of a material which transmits light such that the exposed surface of the metal portion 11 can be visually observed.

The gelation substance is obtained by swelling through encapsulation of a solution inside a three-dimensional network structure, the network formed of a polymer with a crosslinking agent. The gelation substance is also called a gel or a polymer gel. The gelation substance has substantially the same composition as liquid while exhibiting substantially the same mechanistic nature as solid. This allows the gelation substance to fix the plurality of light transmissive particles 12 onto the exposed surface, and simultaneously, to supply water onto the exposed surface. Examples of the polymer gel used at the light transmissive gelation substance portion 13 include a polyacrylic acid gel and a polyhydroxyethyl methacrylate gel.

By using salt water, acidic solutions, basic solutions and the like as well as pure water as solutions encapsulated inside the network of the polymer crosslinked structure of the gelation substance, the influence of differences between these solutions on soil corrosion of metal can be evaluated. A polymer material in accordance with a set of environmental conditions such as a pH, an ionic strength and a solution composition must be selected through understanding of how the gelation substance behaves in terms of its swelling under each set of conditions.

For example, although a polyacrylic acid gel and a polyhydroxyethyl methacrylate gel is obtained by swelling and gelation using pure water as the solution, they cannot function as the gelation substance due to their swelling ratios decreasing by use of a solution having a high ionic strength or a low pH.

For example, when the evaluation is performed with a solution having a low pH, a semi-interpenetrating polymer network gel can be used which has polyvinyl pyrrolidone (PVP) introduced into chitosan, which has amino groups (see Non-Patent Literature 3). Chitosan is obtained by hydrolyzing chitin, which is a main component of shells of crustaceans.

For example, when the evaluation is performed with a solution having a high pH, a composite gel of k-carrageenan having sulfate groups and chitosan or a composite gel of xanthan (xanthan gum) having carboxyl groups and chitosan can be used (see Non-Patent Literature 4). Extraction of red algae can afford k-carrageenan and Extraction of bacteria, *Xanthomonas campestris*, can afford xanthan.

For example, when the evaluation is performed with a solution having a high salt concentration, a polyethylene oxide (PEO) gel, which shows a swelling ratio substantially the same as or more than that in pure water, in a solution containing alkali metal salt (LiCl) and alkaline earth metal salt ($MgCl_2$) can be used (see Non-Patent Literature 5).

The polymer gel used at the light transmissive gelation substance portion 13 needs to have a light transmissivity at which the exposed surface of the metal portion 11 can be observed visually or with various microscopes from the outside. Therefore, the thickness of the gelation substance formed on the exposed surface is desirably about 0.5 to 1 mm. Nevertheless, the thickness of the gelation substance is not limited to 0.5 to 1 mm as long as the light transmissivity can be secured.

Notably, both the light transmissive particles 12 and the light transmissive gelation substance 13 desirably have substantially the same refractive indices. This makes the exposed surface of the metal portion 11 easily observed.

The metal fixation portion 14 covers and fixes all the faces, of the metal portion 11, except one exposed surface thereof. Moreover, in order to secure conduction essential in performing the electrochemical measurement, the metal fixation portion 14 serves as a fixation of the connection portion between the metal portion 11 and the conduction portion 15. The metal fixation portion 14 covering all the faces, of the metal portion 11, except the exposed surface can define a corrosion reaction area with the exposed surface to allow the correct corrosion rate to be calculated using the electrochemical measurement.

A material used for the metal fixation portion 14 needs to be selected so as to have sufficient strength for fixing the metal portion 11 and to be a material capable of enduring in an external corrosion environment. In order to satisfy such conditions, epoxy resin or the like may be used for the metal fixation portion 14.

If the metal fixation portion 14 does not have sufficient strength, gaps arise between the peripheral edge of the exposed surface of the metal portion 11 and the metal fixation portion 14. When this portion of gaps causes a special corrosion pattern, called "crevice corrosion", which is not originally inferred to arise, the correct evaluation of corrosion of the metal portion 11 cannot be performed. Since the crevice corrosion progresses locally at a high corrosion rate, it is inferred that the result obtained from the electrochemical measurement results in overestimating the evaluation. Moreover, if the metal fixation portion 14 is not a material capable of enduring in the external corrosion environment, there arise risks such as exposure of a face, of the metal portion 11, except the exposed surface, incapability of performing electrochemical measurement due to insufficient contact between the metal portion 11 and the conduction portion 15.

The conduction portion 15 is in contact with any of the faces, of the metal portion 11, except the exposed surface. The conduction portion 15 is a bridge, in performing the electrochemical measurement, which secures electric conduction between the metal portion 11 and an electrochemical measurement unit. The electrochemical measurement unit is mentioned later. The metal portion 11 and the conduction portion 15 are fixed together by the metal fixation portion 14, and when sure contact between both is wanted to secure, a contact portion between the metal portion 11 and the conduction portion 15 may be fixed with a conductive adhesive tape onto which an adhesive agent is further applied to fix the contact portion.

Modification 1 of Electrode

As Modification 1 of the electrode 10 of the present embodiment shown in FIG. 1, a plurality of light transmissive gelation substances may be used.

Figure 2A:
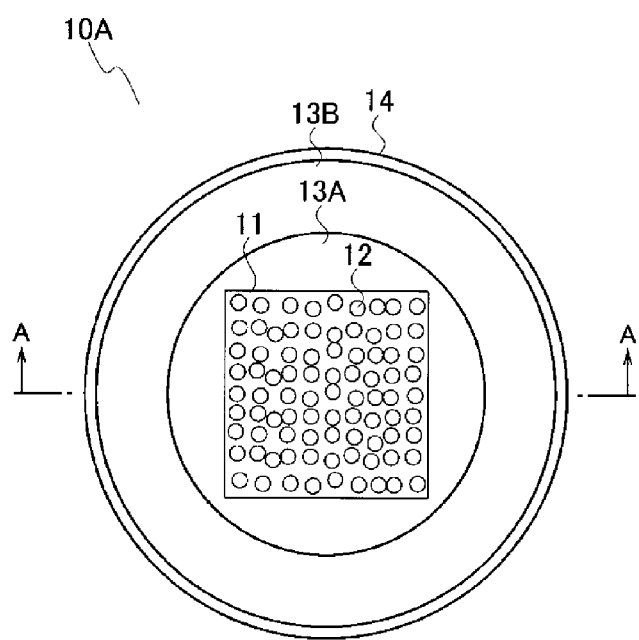
FIG. 2 is a structure diagram schematically showing a configuration of an electrode having a plurality of light transmissive gelation substance portions.
Figure 2B:
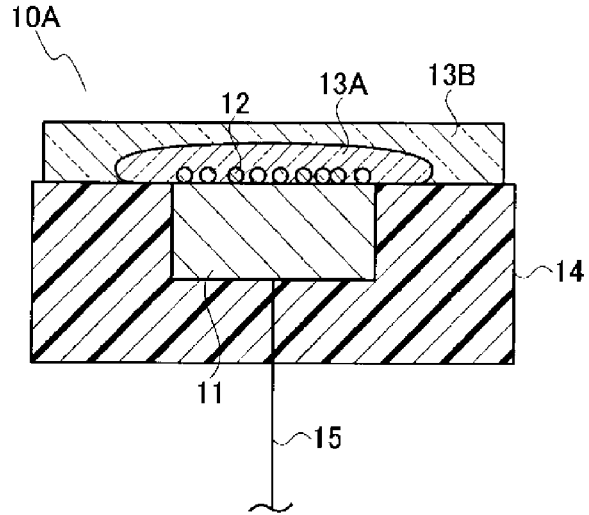

FIG. 2 shows a configuration diagram schematically showing a configuration of an electrode 10A of Modification 1. The electrode 10A of Modification 1 has a plurality of light transmissive gelation substance portions 13A and 13B. FIG. 2(*a*) is a plan view as the electrode 10A of Modification 1 is viewed from the above. FIG. 2(*b*) is a sectional view of the electrode 10A taken along the A-A line shown in FIG. 2(*a*).

In the electrode 10A shown, a physical gel can be used for a first light transmissive gelation substance portion 13A, and a chemical gel for a second light transmissive gelation substance portion 13B. The physical gel is obtained by crosslinking polymer chains through noncovalent bonds originated from hydrogen bonds, van der Waals force or the like, and is also called a weakly bonded gel. The chemical gel is obtained by crosslinking them through covalent bonds, and is also called a strongly bonded gel.

Since the physical gel has relatively high fluidity, that is, a character close to liquid, it efficiently supplies water onto the exposed surface of the metal portion 11. Since the chemical gel has relatively low fluidity, that is, a character close to solid, it secures adhesion and close contact between the exposed surface and the light transmissive particles 12. Examples of the physical gel include agar and a polystyrene gel. Examples of the chemical gel include a polyacrylic acid gel, a polyhydroxyethyl methacrylate gel and a polyacrylamide gel.

Modification 2 of Electrode

As Modification 2 of the electrode 10 of the present embodiment shown in FIG. 1, a plurality of metal portions 11 may be included.

Configurations of electrodes differ depending on the technique of electrochemical measurement. For example, when a three-electrode system is employed, the electrode 10, 10A shown in FIG. 1 or FIG. 2 is used. The number of electrodes used for the three-electrode system is three of a working electrode, a counter electrode and a reference electrode. As the working electrode in the three-electrode system, the electrode 10, 10A is employed which has the metal portion 11 that is formed of the same material as that of a buried metal material to be analyzed.

When a two-electrode system is employed, the number of electrodes is two, and the electrode of Modification 2 is employed which has the plurality of metal portions 11.

Figure 3A:
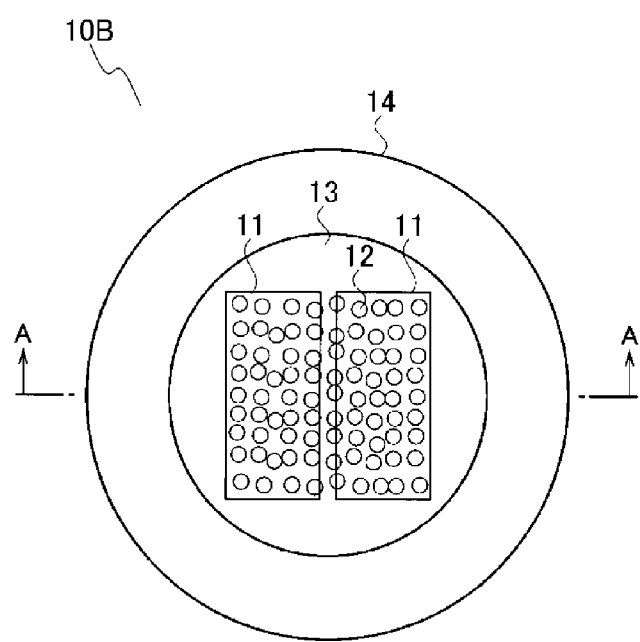
FIG. 3 is a structure diagram schematically showing a configuration of an electrode having two metal portions.
Figure 3B:
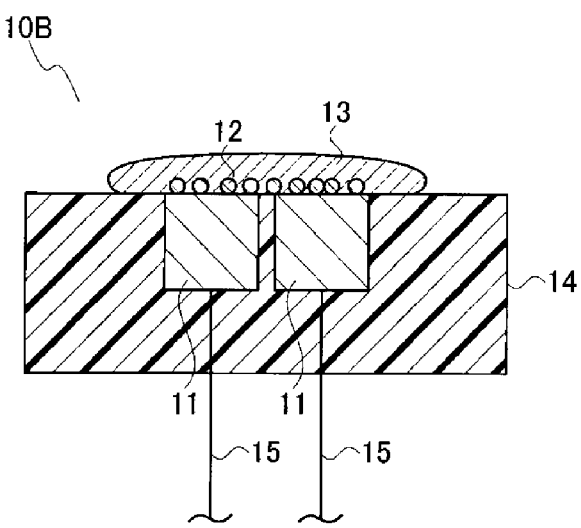

FIG. 3 shows a configuration diagram schematically showing a configuration of an electrode 10B of Modification 2. The electrode 10B shown in FIG. 3 is different from the electrode 10 shown in FIG. 1 in including two metal portions 11 and two conduction portions 15 and is the same as the electrode 10 in terms of its configuration except those. The electrodes used in the two-electrode system are a working electrode and a counter electrode. The working electrode and the counter electrode are equivalent to the two metal portions 11.

Notably, when the three-electrode system is used, the spontaneous potential of the metal portion 11 can be measured due to the presence of the reference electrode. Therefore, DC polarization resistance measurement and anodic corrosion current measurement which require the spontaneous potential of the metal portion 11 can be performed as well as AC impedance measurement. On the other hand, introduction of the reference electrode causes a concern that a salt solution in high concentration flows into the measurement system, which can affect swelling behavior of the light transmissive gelation substance 13. Accordingly, some measures should be taken such as using a salt bridge.

Meanwhile, when the two-electrode system is used, the configuration shown in FIG. 3 can provide all the electrodes thereof, and hence, the measurement system is simple and easily built. Moreover, due to no use of a reference electrode, the measurement system is free from a concern of its contamination with a salt solution. Nevertheless, since the spontaneous potential of the metal portion 11 cannot be measured with the two-electrode system differently from the three-electrode system, it should be noted that only AC impedance measurement and the like are the applicable electrochemical measurements. The specifications of electrodes and the measurement technique may be selected in accordance with the purpose of use of the real time corrosion analysis electrodes.

Real Time Corrosion Analysis Device

FIG. 4 is a structure diagram schematically showing an exemplary configuration of a real time corrosion analysis device of the present embodiment. A real time corrosion analysis device shown at least includes one electrode portion 100, one image capture unit 20, one electrochemical measurement unit 30 and one analysis unit 40.

FIG. 5 is a structure diagram schematically showing a configuration of the electrode portion 100 in the case where a three-electrode system is used for electrochemical measurement. The electrode portion 100 shown has a working electrode 10, 10A, a counter electrode and a reference electrode. These three electrodes are electrically connected to the electrochemical measurement unit 30. For the working electrode 10, 10A, the electrode 10, 10A that has the metal portion 11 of the same material as that of a buried metal material to be analyzed is used (FIG. 1, FIG. 2). For the counter electrode, for example, platinum, carbon and the like may be used. For the reference electrode, for example, a silver-silver chloride electrode, a saturated calomel electrode (calomel electrode) or the like may be used.

FIG. 6 is a structure diagram schematically showing a configuration of the electrode portion 100 in the case where a two-electrode system is used for electrochemical measurement. For the electrode portion 100 shown, the electrode 10B including the two metal portions 11 and the two conduction portions 15 is used as the working electrode and the counter electrode (FIG. 3). The two metal portions 11 (working electrode; counter electrode) are electrically connected to the electrochemical measurement unit 30.

As shown in FIG. 5 and FIG. 6, the electrode 10, 10A, 10B is preferably left still in the state of being immersed in a solution in order to prevent desiccation of the light transmissive gelation substance portion 13. This is because if the light transmissive gelation substance portion 13 is dried, water required for the corrosion reaction cannot be supplied onto the exposed surface of the metal portion 11, and in addition, the exposed surface cannot be observed due to decrease in light transmittance of the light transmissive gelation substance portion 13 caused by shrinkage of the gelation substance.

Moreover, the solution to be used should be the same as the solution used in causing the light transmissive gelation substance 13 to swell. This is because the light transmissive gelation substance 13 possibly shrinks depending on the substance used for it through its contact with a solution having a different swelling behavior, which can reduce the light transmittance.

Notably, when a mechanism, for example, having a humidifying function is included such that the light transmissive gelation substance portion 13 is not dried, the electrode 10, 10A, 10B including the light transmissive gelation substance portion 13 does not have to be left still in the state of being immersed in the solution.

As shown in FIG. 5 and FIG. 6, the image capture unit 20 has a function of capturing images of the exposed surface of the metal portion 11 from the direction where the light transmissive particles 12 and the light transmissive gelation substance portion 13 are arranged. A user can observe corrosion behavior of the exposed surface with the captured images of the exposed surface by the image capture unit 20. For example, the user can discriminate places that are subject to corrosion (that is, active regions) from places that are not subject to corrosion (that is, inactive regions) out of the exposed surface. Notably, each of the captured images may be a moving image which lasts for a predetermined time period or a still image captured in predetermined timing.

An image capture device with appropriate resolution in accordance with the purpose is used for the image capture unit 20. When a whole image for the exposed surface is wanted to be observed, a CCD camera or a 3D macroscope, with low resolution, can be exemplarily used. Moreover, when localized corrosion on the exposed surface is wanted to be observed in detail, an optical microscope or a confocal laser microscope, with high resolution, can be exemplarily used. Furthermore, when molecular scale corrosion behaviors and corrosion mechanisms are observed, a transmission electron microscope can be exemplarily used.

It should be noted that an atomic force microscope or a scanning electron microscope, which acquires surface images by means of probe scanning, cannot be used since the exposed surface is covered by the light transmissive particles 12 and the light transmissive gelation substance portion 13.

Moreover, an image collection time should be noted as to the image capture device used for the image capture unit 20. This is because when the images captured by the image capture unit 20 and the measurement results by the electrochemical measurement unit 30 are used together, a long image collection time causes incapability of comparing both results by a time point. For example, the image collection time of the optical microscope or the transmission electron microscope is 10 ms to 0.1 s, and that of the confocal laser microscope is 0.1 s to 1 s. An image capture device to be used may be selected based on which extent a displacement in time between the image capturing and the electrochemical measurement is allowed to.

Figure 7:
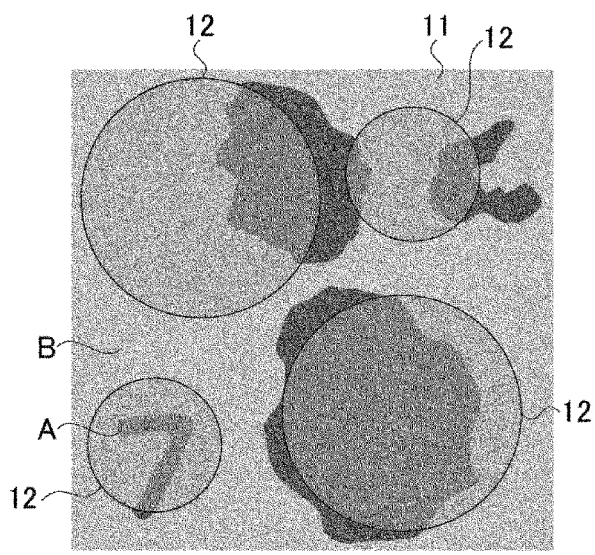
FIG. 7 exemplarily showing an expanded view of a captured image of an exposed surface of a metal portion.

FIG. 7 is a diagram exemplarily showing an expanded image having the exposed surface of the metal portion 11 expanded from an image, of the electrode 10, 10A, 10B (hereinafter called "electrode 10"), captured by the image capture unit 20. From FIG. 7, the active region A and the inactive region B can be determined on the exposed surface. One can thereby understand information regarding corrosion status, for example, that a region where water exists which is captured between the light transmissive particles 12 and the exposed surface through capillarity tends to be an active region A, and that a region where the exposed surface and the gas phase are in contact with each other and a region where the exposed surface and the light transmissive particles 12 are in contact with each other tend to be inactive regions B. Obtaining such information leads to analysis of tendencies of the active regions A and the inactive regions B and elucidation of mechanisms of corrosion occurrence, for each of the types of metals and the types of solutions used.

Notably, when the areas of the active regions A and the inactive regions B are calculated, it is desirable to beforehand calculate the refractive indices of the light transmissive particles 12 and the light transmissive gelation substance 13 to correct both refractive indices.

The electrochemical measurement unit 30 is connected to the electrode 10 of the electrode portion 100 via the conduction portion 15, and measures a polarization resistance, an anodic corrosion current and the like by means of electrochemical techniques in order to obtain a corrosion rate and a corrosion behavior.

For example, when the corrosion rate is electrochemically calculated, there is generally used a technique of measuring a reaction resistance (polarization resistance Rp) with corrosion progressing (see Non-Patent Literature 6). Examples of the operable technique of measuring the polarization resistance Rp include a DC polarization resistance method and an AC impedance method.

In a measurement by the DC polarization resistance method, a current and a potential are scanned such that the exposed surface of the metal portion 11 is not damaged and the potential falls within a range where the resistance value can be calculated from the obtained current-potential characteristics, with the spontaneous potential set as a reference. For example, it may be performed within ±5 [mV], which are applied potentials in the AC impedance method, which is considered as being small in influence on a metal surface among electrochemical measurements. The polarization resistance Rp is calculated from a slope in the obtained current-potential characteristics. As a method for calculating the slope, for example, a least squares method may be used or an extrapolation method may be used.

A measurement by the AC impedance method is performed from a higher frequency to a lower frequency and results in appearances of capacitive semicircles in a high frequency domain and a low frequency domain of a Nyquist diagram thus obtained.

Figure 8:
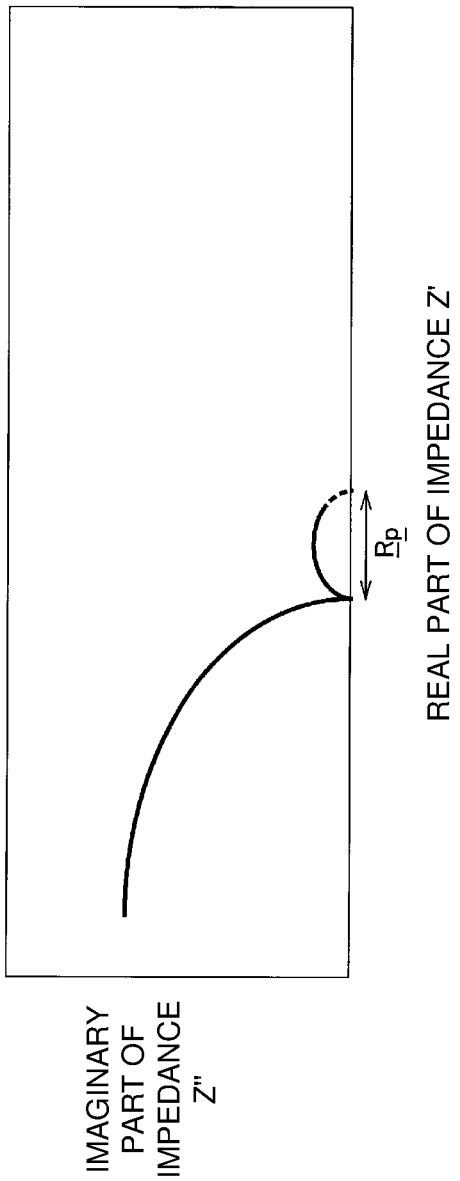
FIG. 8 is a diagram exemplarily showing a Nyquist diagram.

FIG. 8 exemplarily shows a Nyquist diagram. Since the polarization resistance Rp is considered as being originated from an arc in the low frequency domain, the polarization resistance Rp is calculated from values, on the abscissas (real part of the impedance, Z' [Ω·cm$^2$]), from the start point to the end point of the semicircle in the low frequency domain. The performance is preferable with the AC applied potential within ±5 [mV], which are considered as being small in influence on a metal surface.

Notably, a possibility is inferred that a resistance value for the light transmissive particles 12 appears to be unignorably large over the polarization resistance Rp depending on the material of the light transmissive particles 12 since as the polarization resistance Rp obtained by the DC polarization resistance method, a resistance value of the whole measurement system is calculated.

On the other hand, as to the AC impedance method, the semicircle in the low frequency domain only reflects the polarization resistance Rp and the semicircle in the high frequency domain only reflects a resistance originated from the light transmissive particles 12 (soil), for example, in FIG. 8 since measured resistance values can be separated in accordance with frequencies of applied potentials. Therefore, by the AC impedance method, the polarization resistance Rp can be solely and correctly obtained. Accordingly, the electrochemical measurement unit 30 preferably employs the AC impedance method to perform electrochemical measurement.

The analysis unit 40 performs analysis of a corrosion distribution and concave and convex shapes using images captured by the image capture unit 20, and calculation of the corrosion rate and analysis of the corrosion behavior using the measurement result of the electrochemical measurement unit 30.

The analysis unit 40 performs image analysis on the captured images (moving images or still images) of the exposed surface of the electrode 10 output from the image capture unit 20. For example, when a CCD camera, an optical microscope or the like is used for the image capture unit 20 (image capture device), the analysis unit 40 analyzes a captured image using colors (color tones) to calculate the total area of the active regions A. Specifically, it determines a portion where a corrosion product is generated on the exposed surface of the metal portion 11 and the color has changed to reddish brown or the like as an active region A, and determines a portion unlike this as an inactive region B.

As possible corrosion products, one can typically come up with red rust (brown) and black rust. Therefore, the analysis unit 40 analyzes the colors in the captured image and calculates a portion that has predetermined one or more colors each corresponding to rust such as red rust and black rust as an active region A from the captured image. Otherwise, since all the portions except those of iron are transparent, the analysis unit 40 may determine the colors other than that of the iron base as corresponding to corrosion products (rust) to calculate a portion that has a color other than that of the iron base in the captured image as an active region A.

Otherwise, when a 3D macroscope, a transmission electron microscope or the like is used for the image capture unit 20, for example, the analysis unit 40 analyzes a captured image using concave and convex shapes on the surface, determines a portion where the thickness decreases due to corrosion, that is, a recess portion as an active region A, and determines a portion unlike this as an inactive region B. The analysis unit 40 performs image analysis of detecting such recess portions in the captured image as above to calculate the total area of the active regions A.

The analysis unit 40 accepts the measurement result output from the electrochemical measurement unit 30 and performs predetermined processing and calculation. For example, when the polarization resistance Rp is measured by the DC polarization resistance method, the AC impedance method or the like, the analysis unit 40 calculates a corrosion current density $i_{corr}$ from the polarization resistance Rp on the basis of the following formula.

Formula 1

$$i_{corr} = K \cdot \frac{1}{R_p} \quad (1)$$

Here, $i_{corr}$, K and Rp denote a corrosion current density [A/cm$^2$], a conversion coefficient [V] and a polarization resistance [Ω·cm$^2$], respectively. In this case, the conversion coefficient K is calculated in advance. The conversion coefficient K is calculated on the basis of the following formula by deriving Tafel slopes from anodic and cathodic polarization curves (see Non-Patent Literature 7).

Formula 2

$$K = \frac{\beta_a \cdot \beta_c}{2.3(\beta_a + \beta_c)} \quad (2)$$

Herein, βa and βc denote an anodic slope [V/decade] and a cathodic slope [V/decade], respectively. Otherwise, the conversion coefficient K may be calculated without measurement of Tafel slopes, supposing βa=βc=0.1 [V/decade] (see Non-Patent Literature 8).

Next, the analysis unit 40 calculates a corrosion rate r on the basis of the following formula.

Formula 3

$$r = \frac{M}{z\rho F} \cdot i_{corr} \quad (3)$$

Herein, r, z, ρ, F and M denote a corrosion rate [cm/sec], an ionic valence, a density [g/cm$^2$], the Faraday constant [C] and an atomic weight [g/mol]. There are the prescribed values of z (ionic valence), ρ (density) and M (atomic weight) for each material used for the metal portion 11 (working electrode) of the electrode 10.

The analysis unit 40 calculates a corrosion rate of the metal portion 11 using the captured image by the image capture unit 20 and the measurement result of the electrochemical measurement unit 30. Specifically, it calculates the area of the active regions A on the exposed surface of the metal portion 11 from the captured image by the image capture unit 20, and corrects the corrosion rate calculated from the measurement result of the electrochemical measurement unit 30 using the area of the active regions A. As above, in the present embodiment, use of the captured image by the image capture unit 20 and the measurement result of the electrochemical measurement unit 30 leads to highly accurate evaluation of the amount of corrosion and elucidation of mechanisms regarding occurrence and progress of corrosion.

For example, when only the electrochemical measurement unit 30 is operated in the situation that localized corrosion occurs on the exposed surface of the metal portion 11, the derived result indicates an average corrosion rate on the surface area of the exposed surface. It is useless for the average corrosion rate to be applied to a localized corrosion pattern (corrosion mode) of getting holes, such as pitting corrosion.

In the present embodiment, the analysis unit 40 acquires the area (total area) of the active regions A from the captured image by the image capture unit 20, performs correction (conversion) into the corrosion rate from the area of the active regions A. For example, when an electrode area is b (mm$^2$) and a corrosion rate is x (mm/year), it is typically determined that the thickness of metal decreases due to corrosion at x (mm) per year on average over the electrode area b. Nevertheless, when the active regions A correspond to a % of the electrode area b under the aforementioned conditions, a calculation formula for performing correction into the corrosion rate for the area of the active regions A is as follows.

$$x \text{ (mm/y)} \times (b/(ab/100)) = 100x/a \text{ (mm/y)}$$

Namely, when the active regions A are 50%, the calculated corrosion rate is to be 2×(mm/y) through the correction.

As above, the analysis unit 40 of the present embodiment outputs, as the analysis results, not only the corrosion rate calculated from the measurement result of the electrochemical measurement unit 30 but also the corrected corrosion rate obtained by correcting the former corrosion rate in accordance with the corrosion status. Moreover, the analysis unit

40 outputs the ratio of the active regions A acquired from the captured image, and a chronological image indicating a transition of behaviors of corrosion, such as a distribution of the active regions A.

Based on such analysis results (output data) of the analysis unit 40, a user can make highly valid evaluation even in the case of a localized corrosion pattern. For example, he/she can make, from image color analysis on the captured image, determination that much corrosion occurs in the region where soil particles are in contact with the metal surface and the region where water exists that is captured in gaps in the vicinity where soil particles and the metal surface in contact with each other through capillarity, or other determination.

Moreover, when a 3D macroscope or the like is used for the image capture unit 20, the analysis unit 40 can calculate the area of the recess parts as the active regions A from the captured image and correct the corrosion rate calculated from the measurement result of the electrochemical measurement unit 30 using the aforementioned calculation formula. Based on the analysis results of the analysis unit 40, the user can thereby make highly valid evaluation in accordance with a corrosion pattern.

Moreover, the analysis unit 40 calculates and outputs the amount of corrosion (amount of decrease in thickness due to corrosion) based on the volume of the recess parts in the captured image. The user can determine the corrosion status in higher accuracy by comparing and examining the analysis result of the electrochemical measurement unit 30 with the amount of corrosion.

Specifically, the analysis unit 40 calculates the amount of corrosion by converting the degree to which the corrosion reaction hardly occurs (charge transfer resistance) into the corrosion current on the basis of the measurement result of the electrochemical measurement, calculating the corrosion rate, and after that, integrating the chronological change in corrosion rate over time. When the amount of corrosion is calculated only using the measurement result of the electrochemical measurement as above, the amount of corrosion cannot be determined on the basis of the actual corrosion status of the metal surface. Therefore, the analysis unit 40 of the present embodiment may also output the amount of corrosion that is calculated from the measurement result captured image along with output of the amount of corrosion that is calculated from the electrochemical measurement, in order to support validity of the latter amount of corrosion. As above, the user can use the amount of corrosion calculated from the captured image by the 3D macroscope when examining validity of the result obtained from the electrochemical measurement.

Moreover, from the captured image output by the analysis unit 40, the user can get the picture of a corrosion mode and its chronological change (whether the portion of corrosion is circular, whether the circle grows larger over time, if not, whether the corrosion progresses in the depth direction without change in its shape, and other situations).

Moreover, when the electrochemical measurement unit 30 exemplarily employs the anodic polarization measurement, corrosion behavior on the exposed surface of the metal portion 11 can be analyzed with the captured image by the image capture unit 20 combined. For example, an optical microscope is applied to the image capture unit 20, and the anodic polarization measurement is performed by the electrochemical measurement unit 30.

The analysis unit 40 outputs a curve (anodic polarization curve) indicating a chronological change of a dissolution current density relative to the electrode potential as the measurement result of the anodic polarization measurement. The anodic polarization curve can be some basis of determining whether the metal is corroded (in the active state) or not (in the passive state). In specific electrochemical measurement, the change in dissolution current density is analyzed under application of voltage in the direction of being noble (positive) with the potential (spontaneous potential) of the metal left untouched as the reference.

Outputting the anodic polarization curve and the captured image indicating the chronological corrosion status by the analysis unit 40 leads to model construction and mechanism analysis of occurrence of pitting corrosion. Specifically, when the exposed surface is being dissolved, a rise of the current value is observed on the anodic polarization curve. When a pit is generated which is the starting point of pitting corrosion, its character can be determined with the behavior of the anodic polarization curve. For example, a current spike can be regarded as occurrence of a repassivating pit, and a sudden rise of the current can be regarded as occurrence of a growing pit (see Non-Patent Literature 9).

At the same time, the image capture unit 20 can acquire changes in appearance such as a process of generation and a change in mode of pits. For example, some information can be obtained regarding which mode an early-stage pit appears in, an estimation that a sparingly soluble corrosion product might be generated at the time point when a repassivating pit appears, an estimation that pitting corrosion might progress in the depth direction in consideration of no observations on change in mode of pits in spite of appearance of growing pits, and other situations.

Figure 9:
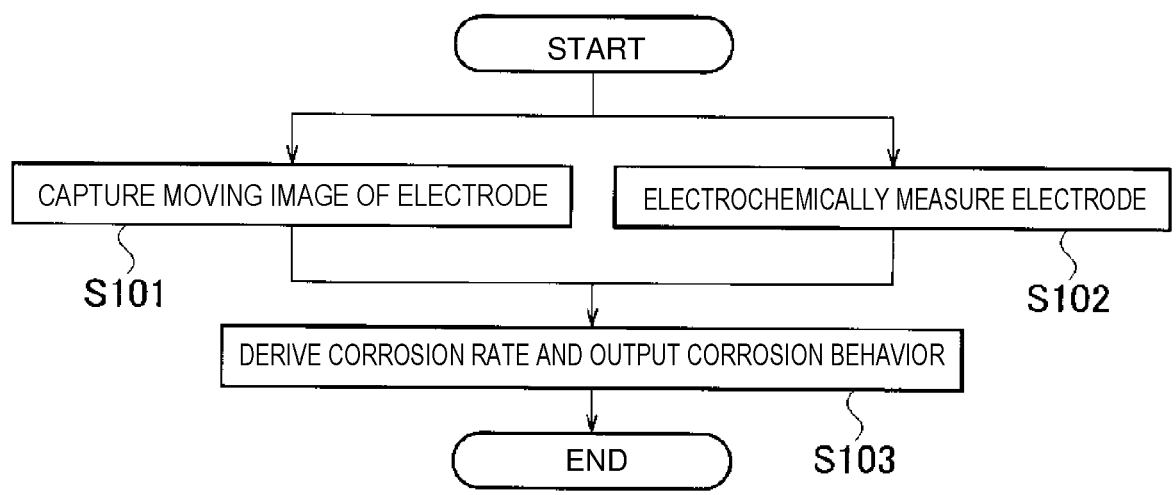
FIG. 9 is an operation flow showing a processing procedure of a corrosion analysis method of the present embodiment.

FIG. 9 is an operation flow showing a processing procedure of calculating a corrosion rate and outputting an image presenting chronological change in corrosion behavior in the real time corrosion analysis method of the present embodiment. As shown in FIG. 9, the image capture unit 20 captures a moving image of the exposed surface of the electrode 10 (step S101). In parallel to step S101, the electrochemical measurement unit 30 performs electrochemical measurement of the electrode 10 (step S102).

Then, the results obtained from the image capture unit 20 and the electrochemical measurement unit 30 are sent to the analysis unit 40, which, through various analyses of those, calculates the corrosion rate and the amount of corrosion and outputs the image presenting the chronological corrosion behavior (step S13). The user thereby can analyze the corrosion of the buried metal material in real time.

Notably, the analysis unit 40 collates the results obtained from the image capture unit 20 and the electrochemical measurement unit 30. Since in collating both, examination is performed on the results obtained at the same time point, they should be sufficiently carefully recorded on a media in terms of their time points. For example, calculations of corrosion rates by an impedance method are performed at constant time intervals. In this case, the intervals of measurements can be arbitrarily set. In the case of anodic polarization measurement, a scanning speed is set (for example, 0.1 mV/sec) when scanning is performed in the direction of the potential being noble from the spontaneous potential. How much voltage the potential is scanned to can be arbitrarily set, and when it is known how much voltage the scanning is performed to, a time from the start of the measurement from the end thereof can be associated with the scanning speed.

In the present embodiment, when calculating the corrosion rate, the analysis unit 40 acquires the area of the active regions from the moving image of the image capture unit 20 and the polarization resistance from the measurement result of the electrochemical measurement unit 30 to derive the corrosion rate in accordance with the corrosion status.

The corrosion behavior can be evaluated by understanding the mode of corrosion pits from the moving image, of the image capture unit 20, output from the analysis unit 40 and using the anodic polarization curve output from the analysis unit 40.

Notably, the image capture device in the image capture unit 20, the image capturing technique therein, and the measurement technique and the measurement mode in the electrochemical measurement unit 30 are not limited to those in the present embodiment at long as the corrosion rate can be derived and the corrosion behavior can be evaluated.

The electrode of the present embodiment described above is an electrode for analyzing corrosion of a buried metal material in real time, the electrode including: a metal portion composed of a metal material, a metal fixation portion covering and fixing the metal portion except on one exposed surface thereof; a plurality of particles arranged so as to be in contact with the exposed surface; a gelation substance portion covering the plurality of particles being in close contact with the exposed surface and the metal fixation portion; and a conduction portion that secures electric conduction with the metal portion, wherein the plurality of particles and the gelation substance portion transmit light.

As above, the electrode of the present embodiment is an electrode including light transmissive particles, with high transmissivity, which simulate soil particles as a solid phase, and a light transmissive gelation substance (gel) which plays a role of a liquid phase of supplying water required for the corrosion reaction while holding contact between the light transmissive particles and the metal surface. Use of the electrode enables real time analysis of corrosion of an underground buried metal material through simulation of surface conditions under which soil corrosion occurs.

Namely, use of the electrode of the present embodiment enables direct in situ (in-the-site) observation of corrosion occurring on a metal surface (exposed surface), and elucidation of which portions on the metal surface correspond to the active regions or the inactive regions. Moreover, the electrode of the present embodiment enables places of active regions arising to be specified, which can largely contribute elucidation of mechanisms of the soil corrosion.

Moreover, according to the corrosion analysis device of the present embodiment, real time analysis of a corrosion surface can be performed simultaneously to electrochemical measurement, and appropriate evaluation can be made so as to meet the reality of the corrosion. Namely, the combination of in situ observation of the exposed surface with a captured image and electrochemical quantitative evaluation enables the analysis results of soil corrosion to be calculated with high reliability, which can lead to establishing a method for evaluating soil corrosion.

For the analysis unit 40 of the real time corrosion analysis device 1 described above, there can be exemplarily used a general-purpose computer system including a CPU (Central Processing Unit; processor), a memory, a storage (HDD: Hard Disk Drive, SSD: Solid State Drive), a communication device, an input device and an output device. In the computer system, functions of the analysis unit 40 are realized by the CPU executing a program, for the analysis unit 40, loaded into the memory. The program for the control unit 40 may be stored in a computer-readable recording medium such as a HDD, a SSD, a USB memory, a CD-ROM, a DVD-ROM or an MO or may be distributed via a network.

Notably, the present invention is not limited to the aforementioned embodiment but various modifications thereof may occur without departing from the scope of its gist.

REFERENCE SIGNS LIST

1 Real time corrosion analysis device
10 Electrode
11 Metal portion
12 Light transmissive particle
13 Light transmissive gelation substance portion
14 Metal fixation portion
15 Conduction portion
20 Image capture unit
30 Electrochemical measurement unit
40 Analysis unit
100 Electrode portion
A Active region
B Inactive region

The invention claimed is:

1. An electrode for analyzing corrosion of a buried metal material in real time, the electrode comprising an electrode structure having:
   a metal portion composed of a metal material;
   a metal fixation portion covering the entire metal portion except an exposed surface of the metal portion and fixing the metal portion in the electrode structure;
   a plurality of particles arranged so as to be in contact with the exposed surface;
   a gelation substance portion covering the plurality of particles and being in close contact with the exposed surface and the metal fixation portion; and
   a conduction portion that secures electric conduction with the metal portion, wherein
   the plurality of particles and the gelation substance portion each transmit light.

2. The electrode according to claim 1, wherein the gelation substance portion contains water for supplying moisture to the exposed surface.

3. The electrode according to claim 1, comprising:
   the metal portion comprising a plurality of metal portions positioned in the metal fixation portion; and
   the conduction portion comprising a plurality of conduction portions, each of the plurality of conduction portions being connected to a single metal portion of the plurality of metal portions.

4. A corrosion analysis device comprising:
   the electrode according to claim 1;
   an image capture unit positioned adjacent to the exposed surface that captures an image of the exposed surface from a direction that allows for capturing an image of the plurality of particles and the gelation substance portion;
   an electrochemical measurement unit that is connected to the electrode via the conduction portion and performs electrochemical measurement of the electrode; and
   an analysis unit connected to the image capture unit and the electrochemical unit that calculates a corrosion rate of the metal portion using an image captured by the image capture unit and a measurement result of the electrochemical measurement unit.

5. The corrosion analysis device according to claim 4, wherein the analysis unit calculates an area of an active region of corrosion on the exposed surface from the captured image and corrects the corrosion rate calculated using the measurement result of the electrochemical measurement unit using the area of the active region.

6. A corrosion analysis method performed by the corrosion analysis device according to claim 4, the method comprising:
- an image capturing step capturing an image of the exposed surface of the metal portion;
- an electrochemical measurement step of parallelly performing electrochemical measurement of the electrode and the image capturing step; and
- a step of calculating a corrosion rate of the metal portion with the analysis unit using the captured image in the image capturing step and the measurement result in the electrochemical measurement step.

7. The electrode according to claim 2, comprising:
- the metal portion comprising a plurality of metal portions positioned in the metal fixation portion; and
- the conduction portion comprising a plurality of conduction portions, each of the plurality of conduction portions being connected to a single metal portion of the plurality of metal portions.

8. A corrosion analysis device comprising:
- electrode according to claim 2;
- an image capture unit positioned adjacent to the exposed surface that captures an image of the exposed surface from a direction that allows for capturing an image of the plurality of particles and the gelation substance portion;
- an electrochemical measurement unit that is connected to the electrode via the conduction portion and performs electrochemical measurement of the electrode; and
- an analysis unit connected to the image capture unit and the electrochemical unit that calculates a corrosion rate of the metal portion using an image captured by the image capture unit and a measurement result of the electrochemical measurement unit.

9. A corrosion analysis device comprising:
- electrode according to claim 3;
- an image capture unit positioned adjacent to the exposed surface that captures an image of the exposed surface from a direction that allows for capturing an image of the plurality of particles and the gelation substance portion;
- an electrochemical measurement unit that is connected to the electrode via the conduction portion and performs electrochemical measurement of the electrode; and
- an analysis unit connected to the image capture unit and the electrochemical unit that calculates a corrosion rate of the metal portion using an image captured by the image capture unit and a measurement result of the electrochemical measurement unit.

10. A corrosion analysis method performed by the corrosion analysis device according to claim 5, the method comprising:
- an image capturing step capturing an image of the exposed surface of the metal portion;
- an electrochemical measurement step of parallelly performing the electrochemical measurement of the electrode and image capturing step; and
- a step of calculating a corrosion rate of the metal portion with the analysis unit using the captured image in image capturing step and the measurement result in the electrochemical measurement step.

* * * * *